(12) United States Patent
Takano et al.

(10) Patent No.: US 6,501,714 B1
(45) Date of Patent: Dec. 31, 2002

(54) METHOD AND APPARATUS FOR CONTROLLING TRACK JUMP

(75) Inventors: Koji Takano, Ogaki (JP); Yuji Kajitani, Saitama-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/444,924

(22) Filed: Nov. 24, 1999

(30) Foreign Application Priority Data

Nov. 27, 1998 (JP) .............................................. 10-337853
Nov. 30, 1998 (JP) .............................................. 10-340496

(51) Int. Cl.$^7$ .................................................. G11B 7/00
(52) U.S. Cl. ................................ 369/44.28; 369/44.29; 369/44.35
(58) Field of Search ........................... 369/44.27, 44.28, 369/44.29, 44.32, 44.34, 44.35, 44.41, 47.1, 53.1, 53.28

(56) References Cited

U.S. PATENT DOCUMENTS 5,428,590 A * 6/1995 Ogino ...................... 369/44.28
6,314,066 B1 * 11/2001 Hong et al. ............... 369/44.26

* cited by examiner

*Primary Examiner*—Muhammad Edun
(74) *Attorney, Agent, or Firm*—Fish & Richardson P.C.

(57) ABSTRACT

A circuit for controlling the moving of a pickup (track jump) between tracks of a recording medium, such as a CD-ROM. The circuit includes a first circuit which generate a pulse signal corresponding to changing points of a track jump signal and an off track signal. A second circuit generates a signal for controlling the moving speed or deceleration of the pickup, as it approaches a target track, in accordance with the pulse signal.

6 Claims, 5 Drawing Sheets

METHOD AND APPARATUS FOR CONTROLLING TRACK JUMP

BACKGROUND OF THE INVENTION

The present invention relates to a method and apparatus for controlling track jump, and more particularly, to a method and apparatus for controlling track jump in a data reproduction apparatus that reads digital data from a disc type recording medium and transfers the data to a computer.

A compact disc (CD) is mainly used as a digital audio recording medium, but it can also be used as a read only memory (CD-ROM) for storing various types of digital data read by computers.

Figure 1:
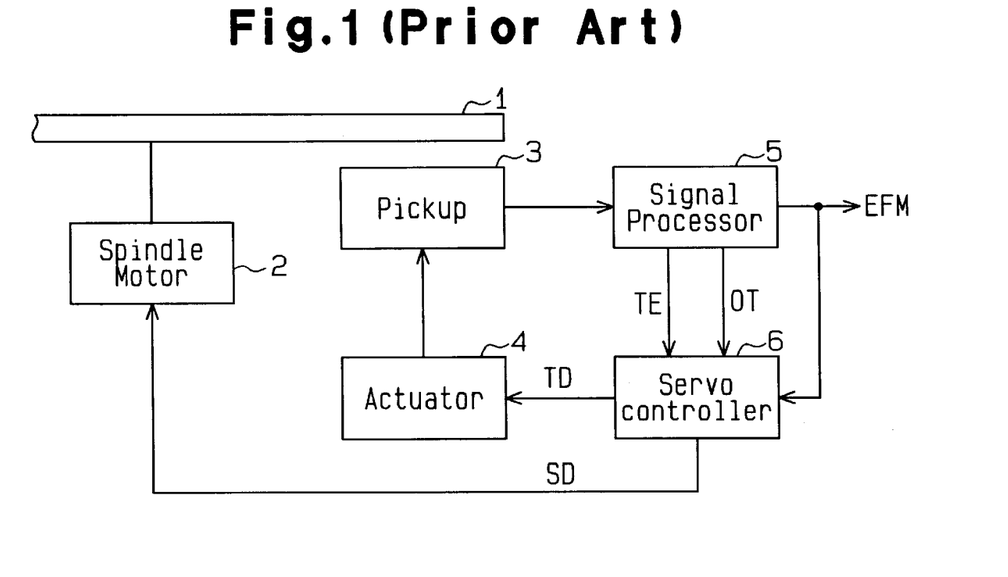
FIG. 1 is a block diagram showing the structure of a prior art disc reproduction apparatus.

FIG. 1 is a schematic block diagram showing a conventional disk reproduction apparatus. A disc 1 has a spiral recording track formed on at least one of its surfaces. Digital data, which is in a predetermined format, is recorded along the recording track. The disc reproduction apparatus includes a pickup 3 to read the data recorded on the recording track. The disc reproduction apparatus further includes a servo mechanism for controlling the position of the pickup 3 relative to the disc 1 so that the pickup 3 tracks the recording track properly.

Figure 2:
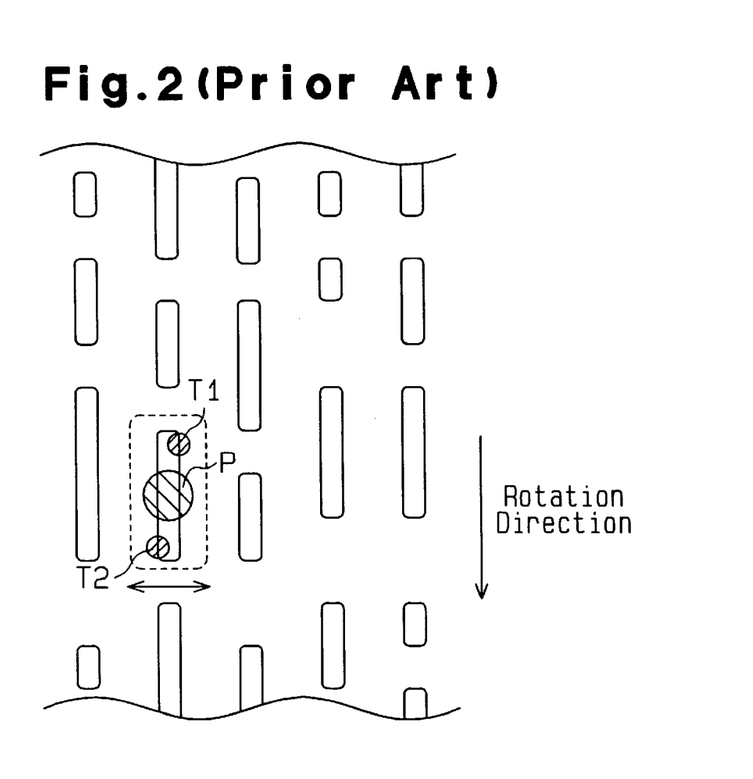
FIG. 2 is a plan view showing the structure of a recording track of a compact disc.

The pickup 3 is arranged opposite the recording track of the disc 1. An actuator 4, which is operated in accordance with a drive signal TD, moves the pickup 3 in the radial direction of the disc 1. The pickup 3 includes laser beam sources and sensors. Referring to FIG. 2, the pickup 3 generates a main reading beam P and a pair of auxiliary reading beams T1, T2 which are radiated toward the recording track. The pickup 3 has a main beam receiving portion and an auxiliary beam receiving portion. The main reading beam P is received by the main beam receiving portion to detect pits on the recording track surface. The auxiliary reading beams T1, T2 are received by the auxiliary beam receiving portion to detect when the pickup 3 moves away from the recording track. The reading beams P, T1, T2 radiated against the pits of the disc 1 are reflected toward the beam receiving portions as weak lights. The reading beams D, T1, T2 radiated against portions other than the pits of the disc 1 are reflected toward the beam receiving portions as strong lights. When the beam receiving portion associated with each of the reading beams P, T1, and T2 receives the corresponding reflection beam, the receiving portion generates a voltage having a value which corresponds to the intensity of the reflected light. The actuator 4 supports the pickup 3 and performs track jump to move the pickup 3 radially along the disc 1 in response to the drive signal TD.

The pickup 3 sends a voltage signal, the value of which corresponds to the main reading beam P, to a signal processor 5. The signal processor 5 performs a waveform shaping process and a digitizing process on the voltage signal to generate an EFM signal. The EFM signal repetitively goes back and forth between a low level and a high level in accordance with the existence of pits.

The signal processor 5 generates a tracking error signal TE from the difference between the voltage values of the auxiliary reading beams T1, T2 and an off track signal OT from a low frequency component of the EFM signal. The waveform of the tracking error signal TE is a sine wave, the polarity of which is inverted each time the pickup 3 moves across the recording track. The tracking error signal TE is digitized to generate a track jump signal TJ.

The voltage value corresponding to the auxiliary reading beam T1 is substantially the same as the voltage value corresponding to the auxiliary reading beam T2 when the pickup 3 is accurately tracking the recording track (i.e., when the pickup 3 is at the proper position). Under these conditions, the tracking error signal TE is at a null level. When the pickup 3 is not accurately tracking the recording track (i.e., when the pickup 3 is not at the proper position), for example, when the position of the pickup 3 is offset inward from the recording track, the voltage value corresponding to the auxiliary reading beam T1 becomes smaller than the voltage value corresponding to the auxiliary reading beam T2 and causes the tracking error signal TE to take a negative value. On the other hand, if the position of the pickup 3 is offset outward from the recording track, the voltage value corresponding to the auxiliary reading beam T2 becomes smaller than the voltage value corresponding to the auxiliary reading beam T1 and causes the tracking error signal TE to take a positive value. When the pickup 3 is completely separated from the recording track, the voltage values of the auxiliary reading beams T1, T2 become equal to each other and cause the tracking error signal TE to become null. The track jump signal TJ is generated from the tracking error signal TE using the null level as a threshold value. Further, the track jump signal TJ goes high or low when the center of the pickup 3 is located at the center of the recording track.

when the pickup 3 is properly tracking the recording track of the disc 1, the signal processor 5 continuously outputs the EFM signal. Thus, the EFM signal has a predetermined amplitude and does not include a low frequency component. Accordingly, the off track signal OT is maintained at a low level when the pickup 3 is properly tracking the recording track. The off track signal OT rises or falls when the center of the pickup 3 is located near an edge of a pit.

As shown in FIG. 1, the signal processor 5 sends the EFM signal, the tracking error signal TE, and the off track signal OT to the servo controller 6. The servo controller 6 generates a spindle motor drive signal SD and the actuator drive signal TD based on the tracking error signal TE and the off track signal OT. The spindle motor drive signal SD controls the spindle motor 2 so that the frequency of the EFM signal is maintained at a predetermined value. The actuator drive signal TD controls the actuator 4 so that the tracking error signal TE has a null level and the off track signal OT is maintained at a low level. The spindle motor drive signal SD and the actuator drive signal TD servo control the spindle motor and tracking.

Figure 3A:
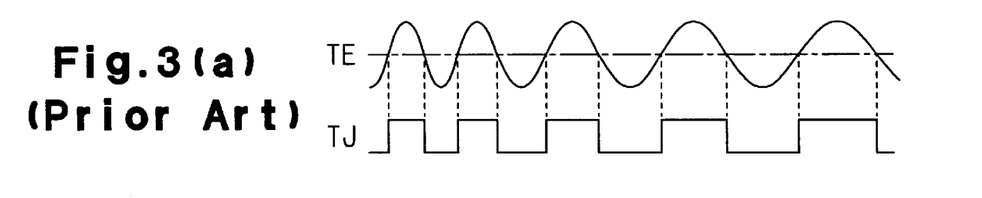
FIG. 3(a) is a chart showing the waveform of a tracking error signal and a track jump signal and FIG. 3(b) is a chart showing the waveform of an EFM signal and an off track signal.
Figure 3B:
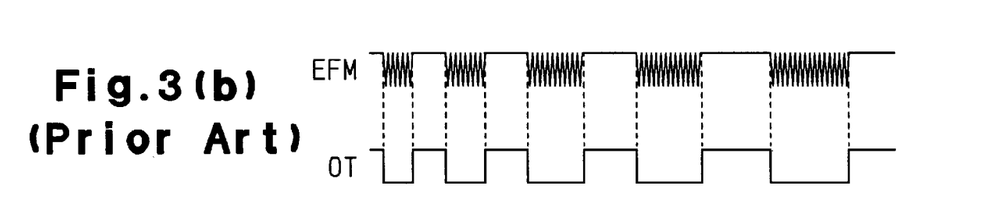

FIGS. 3(a) and 3(b) are charts showing the waveforms of the signals detected when the pickup 3 moves across the lines of the recording track on the disc 1 (when a so-called track jump is performed). The horizontal axis represents time. FIGS. 3(a) and 3(b) show a state in which the pickup 3 gradually decelerates.

As described above, the track jump signal TJ rises or falls when the center of the pickup 3 is located at the center of the recording track. The off track signal OT rises or falls when the center of the pickup 3 is located near the edges of the pits. Accordingly, the phase difference between the off track signal OT and the tracking error signal TE is normally +90°. The tracking error signal TE or the off track signal OT are counted to detect the number of recording tracks the pickup 3 traverses. The moving direction of the pickup 3 is detected by the difference between the phase of the tracking error signal TE and the phase of the off track signal OT. The movement of the pickup 3 is controlled based on the two detection results.

The moving speed of the pickup 3 must be detected to perform the track jump. In other words, the pickup 3 is moved to the desired position by monitoring the moving speed of the pickup 3 and accelerating and decelerating the pickup 3 at optimal timings to decrease the moving time of the pickup 3. During a single cycle of the track jump signal TJ or the off track signal OT, a clock signal CLK is counted to measure the time of the cycle and detect the moving speed. The clock signal CLK, which is sent to the servo controller 6, has a cycle sufficiently advanced from the track jump signal TJ and the off track signal OT.

However, only the average speed during one cycle is obtained in the above speed measuring method. The resolution of the measured speed may then be insufficient and the measured speed may be inaccurate. Accordingly, the pickup 3 may not be able to stop precisely at the predetermined position, causing sliding to occur. In addition, if excessive force is applied to stop the movement of the pickup 3, the pickup 3 may stop before reaching the target position or may move in the reverse direction.

SUMMARY OF THE INVENTION

Accordingly, it is an object of the present invention to provide a track jump control method and control circuit for accurately controlling the moving speed of the pickup.

To achieve the above object, the present invention provides a method for controlling track jump on a disc by a pickup. The method includes the steps of generating a pulse signal corresponding to changing points of a track jump signal and an off track signal, and generating a signal for controlling the moving speed of the pickup in accordance with the pulse signal.

Another aspect of the present invention provides a method for controlling track jump on a disc by a pickup. The method includes the steps of generating a track jump signal having a first changing point when the pickup is located above a track and a second changing point when the pickup is located between adjacent tracks, and generating an off track signal indicating a first state when the pickup is located above a track and a second state when the pickup is located apart from the track. The off track signal is changed from the first state to the second state at a third changing point and changed from the second state to the first state at a fourth changing point. The method also includes the steps of dividing a cycle of the track jump signal and the off track signal into four periods at the first to fourth changing points of the track jump signal and the off track signal, and measuring the length of the divided four periods, and controlling the moving speed of the pickup in accordance with the lengths of the divided four periods.

A further aspect of the present invention provides a method for controlling track jump on a disc by a pickup. The method includes generating a track jump signal having a first changing point when the pickup is located above a track and a second changing point when the pickup is located between adjacent tracks, and generating an off track signal indicating a first state when the pickup is located above a track and a second state when the pickup is located apart from the track. The off track signal is changed from the first state to the second state at a third changing point and changed from the second state to the first state at a fourth changing point. The method further includes the steps of detecting one of the first changing point and the second changing point of the track jump signal corresponding to one of a target track to where the pickup jumps and a track located a predetermined number of tracks before the target track, decelerating the pickup when one of the first changing point and the second changing point is detected, measuring the time between one of the first changing point and the second changing point and one of the third changing point and the fourth changing point of the subsequently generated off track signal, and adjusting the deceleration of the pickup in accordance with the measured time.

In a further aspect, the present invention provides a circuit for controlling track jump on a disc by a pickup. The circuit includes a first circuit for generating a pulse signal corresponding to changing points of a track jump signal and an off track signal, and a second circuit for generating a signal for controlling the moving speed of the pickup in accordance with the pulse signal.

In a further aspect, the present invention provides a circuit for controlling track jump on a disc by a pickup. The circuit includes a measuring circuit for receiving a track jump signal, which has a first changing point and a second changing point, and an off track signal, which has a third changing point and a fourth changing point, and measuring a length between one of the first changing point and the second changing point of the track jump signal and one of the third changing point and the fourth changing point of the off track signal. The first changing point occurs when the pickup is located above a track, the second changing point occurs when the pickup is located between adjacent tracks, the third changing point occurs when the off track signal changes from a first state to a seconded state, and the fourth changing point occurs when the off track signal changes from the second state to the first state. A control circuit is connected to the measuring circuit to generate a drive signal corresponding to the measured result of the measuring circuit.

In a further aspect, the present invention provides a circuit for controlling track jump on a disc by a pickup. The circuit includes a measuring circuit for receiving a track jump signal, which has a first changing point and a second changing point, and an off track signal, which has a third changing point and a fourth changing point, and measuring the length between one of the first changing point and the second changing point of the track jump signal and one of the third changing point and the fourth changing point of the off track signal. The first changing point occurs when the pickup is located above a track, the second changing point occurs when the pickup is located between adjacent tracks, the third changing point occurs when the off track signal changes from a first state to a second state, and the fourth changing point occurs when the off track signal changes from the second state to the first state. A track counter detects one of the first changing point and the second changing point of the track jump signal corresponding to one of a target track to where the pickup jumps and a track located a predetermined number of tracks before the target tracks. A control circuit is connected to the measuring circuit and the track counter for generating a drive signal when one of the first changing point and the second changing point is detected by the track counter. The control circuit controls deceleration of the pickup by adjusting the drive signal in accordance with the time measured by the measuring circuit.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiment together with the accompanying drawings in which.

DETAILED DESCRIPTION OF THE PREFERRED EMBODIMENT

In the drawings, like numerals are used for like elements throughout.

Figure 4:
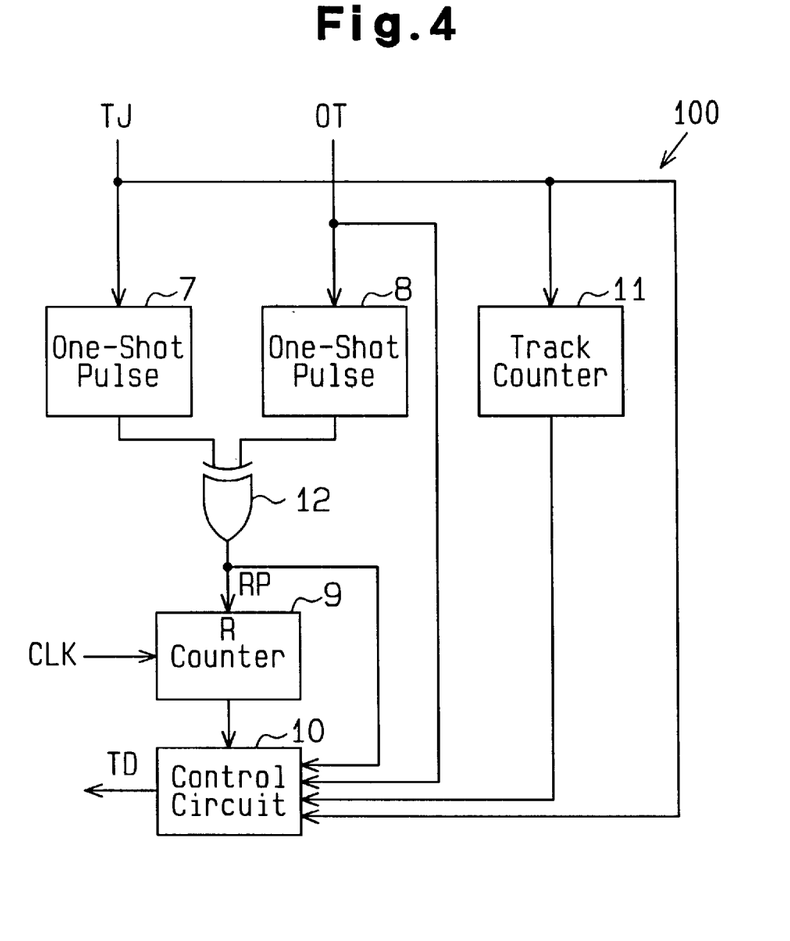
FIG. 4 is a schematic block diagram showing a track jump control circuit according to the present invention.

FIG. 4 is a schematic block diagram showing a track jump control circuit 100 according to the present invention. The track jump control circuit 100 is incorporated in the servo controller 6 of FIG. 1.

The track jump control circuit 100 includes a two one-shot pulse generating circuits 7, 8 and XOR gate 12, a counter 9, a track counter 11, and a control circuit 10.

Figure 5:
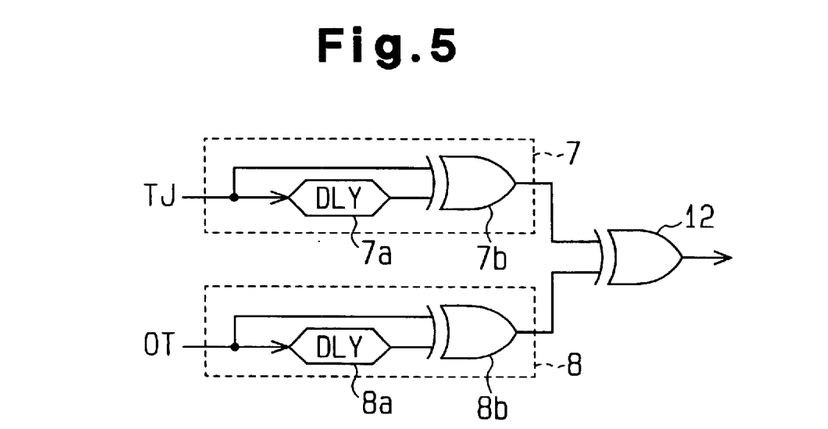
FIG. 5 is a diagram showing a one-shot pulse circuit of the track jump control circuit of FIG. 4.
Figure 6:
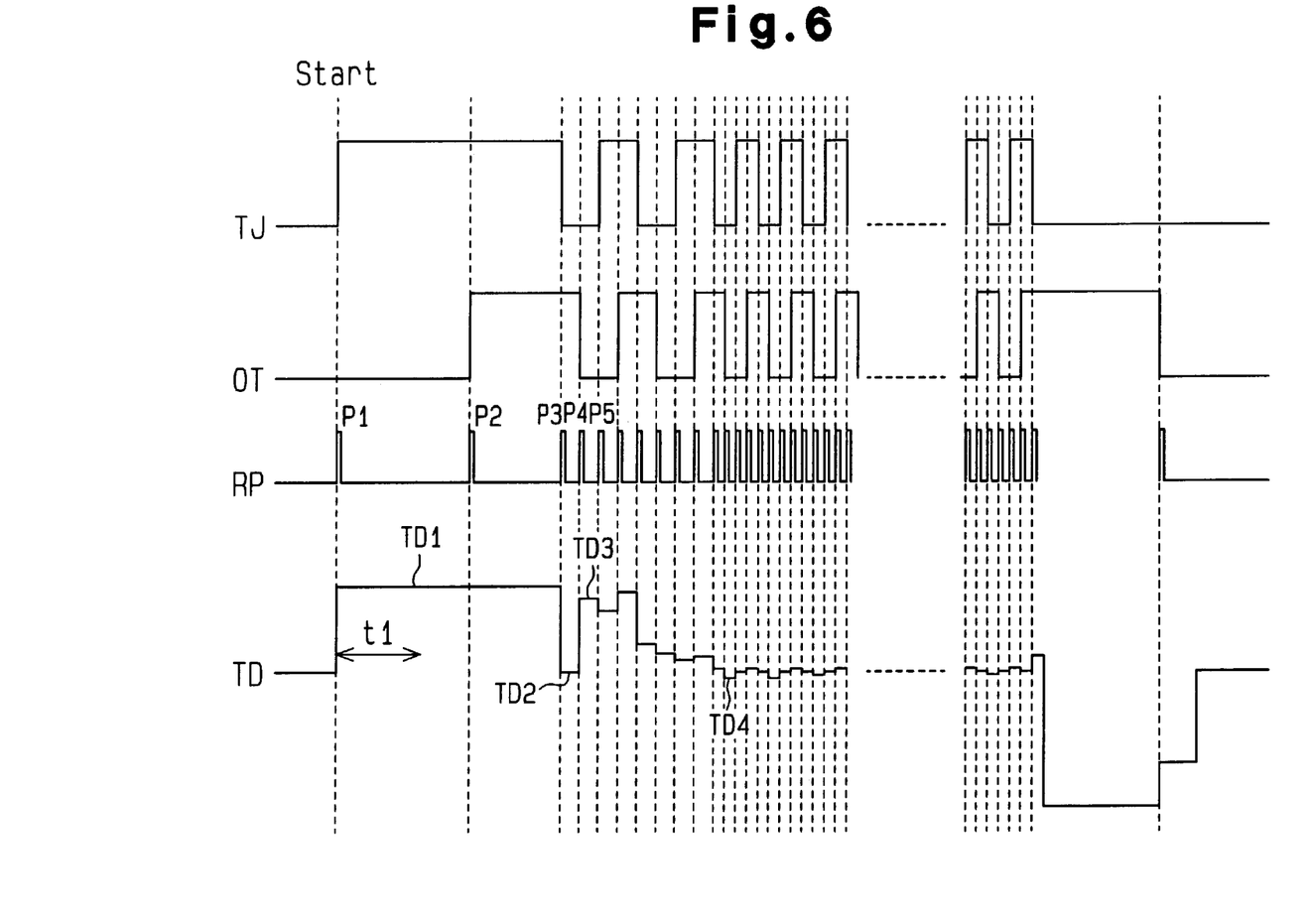
FIG. 6 is a timing chart illustrating a multiple track jump control operation performed by the track jump control circuit of FIG. 4.

The first one-shot pulse generating circuit 7 does not output a signal for a certain period when an input signal is maintained in a low state or a high state and generates a pulse signal at the point when the input signal changes. For example, as shown in FIG. 5, the first one-shot pulse generating circuit/has a delay circuit/a and an XOR gate 7D. The first one-shot pulse generating circuit 7 receives the track jump signal TJ and outputs pulse signals D1, D3, . . . when the level of the track jump signal TJ changes. The second one-shot pulse generating circuit 8 receives the off track signal OT and outputs pulse signals P2, P4, . . . when the level of the off track signal OT changes. The pulse signals P1, P3 . . . and P2, P4,. . . are synthesized by the XOR gate 12 and output from the XOR gate 12 as a latch pulse signal RP. As shown in FIG. 6, the latch pulse signal RP is generated when the level of either the track jump signal TJ or the off track signal OT changes. An OR gate may be used in lieu of the XOR gate 12.

As described above, the track jump signal TJ rises or falls when the center of the pickup 3 is located at the center of the recording track. The off track signal OT rises or falls when the center of the pickup 3 is located at an edge of the track. Thus, the phase difference between the off track signal OT and the track jump signal TJ is ±90°. Accordingly, a single cycle of the track jump signal TJ or the off track signal OT may be divided into four sections at the following four timings.

(1) When the main beam receiving portion of the pickup is arranged at a middle point between adjacent tracks.
(2) When the main beam receiving portion of the pickup is arranged at the center of the track.
(3) When the main beam receiving portion of the pickup is arranged at the center of the track.
(4) When the main beam receiving portion of the pickup moves away from the track.

In other words, the latch pulse signal RP is generated four times whenever the pickup 3 moves across a track.

Returning to FIG. 4, the counter 9 counts the pulses of the clock signal CLK, which has a predetermined cycle that is sufficiently earlier than the latch pulse signal RP, in response to the input of the latch pulse signal RP until the next latch pulse signal RP is input. The counter 9 then sends the count value to the control circuit 10.

The control circuit 10 outputs the drive signal TD to the actuator 4 to perform the track jump. When the track jump is started, the control circuit 10 outputs a drive signal TD1, which has a predetermined level, for a constant time t1 (see FIG. 6). The control circuit 10 maintains the drive signal TD1 until receiving the latch pulse signal RP preferably, one or twice. Afterward, the control circuit 10 maintains the drive signal TD at a null level until receiving the next new latch pulse signal RP. Upon the receipt of the next pulse signal RP, the control circuit 10 outputs a drive signal TD in accordance with the count value from the counter 9. The count value of the counter 9 is compared with a predetermined value. If the count value is greater than the predetermined value, the level of the drive signal TD is increased. If the count value is less than the predetermined value, the level of the drive signal TD is decreased. The predetermined value is a count value determined in correspondence with the optimal moving speed of the pickup 3. The adjustment of the drive signal TD controls the actuator 4 and moves the pickup 3 at an optimal speed.

The track counter 11 receives the track jump signal TJ (or the off track signal OT), counts the received signal, and outputs a count signal the represents the number of tracks on which track jump was carried out. As the pickup 3 approaches the target track of the track jump and reaches the track where deceleration should be commenced (e.g., the track located a predetermined number of tracks before the target track), the track counter 11 sends a count signal to the control circuit 10. In the preferred and illustrated embodiment, the count signal is output when a track located one track before the target track is counted. The control circuit 10 receives the count signal from the track counter 11 and outputs a drive signal TD to decelerate the pickup 3.

A multiple track jump control operation performed by the track jump control circuit 100 will now be described with reference to FIG. 6. FIG. 6 shows the track jump signal TJ, the off track signal OT, the latch pulse signal RP, and the drive signal TD.

Prior to the initiation point "Start", the pickup 3 is located above a track. The track jump signal TJ and the off track signal OT are thus both low. Since the track jump signal TJ may be unstable immediately after starting acceleration, the drive signal TD (TD1), which has a constant level, is output for a constant time t1 so that acceleration occurs at a constant rate. When the pickup 3 moves a certain distance, the pickup 3 is separated from the center of the track, causing the track jump signal TJ to go high. Acceleration at a constant rate is continued even after the constant time t1 elapses. Subsequently, when the track jump signal TJ falls and the latch pulse signal P3 is detected, the drive signal TD (TD2) temporarily goes null and stops the acceleration. The acceleration may also be stopped when the off track signal OT goes high (i.e., when the latch pulse signal P2 is detected).

Subsequent to the latch pulse signal P4 after acceleration is stopped, the movement of the pickup 3 is maintained at a constant speed. The moving speed is computed by measuring the time from when the latch pulse signal P3 is detected to when the off track signal OT goes low, or when the latch pulse signal P4 is detected. If the moving speed is equal to or lower than the target speed (i.e., if the count value is equal to or greater than a predetermined value), the drive signal (TD3) corresponding to the measured value is output and the acceleration is continued until the next latch pulse signal P5 is received. On the other hand, if the moving speed is greater than the target speed (i.e., if the count value of the counter 9 is less than the predetermined value), a drive signal (TD4) having the opposite polarity (in this case, negative polarity) is output to decelerate the pickup 3. When the latch pulse signal P5 is received, the drive signal TD for the period until the next latch pulse signal is received is adjusted in accordance with the count values of the latch pulse signals P4 and P5. Afterward, in the same manner, the speed during the period between the current latch pulse signal RP and one latch pulse signal RP prior to the current latch pulse signal RP is computed every time the latch pulse signal RP is received. The drive signal TD corresponding to the computation result is output until the next latch pulse signal RP is received. The adjustment of the drive signal TD controls the speed of the pickup 3 at a time resolution of one fourth of a cycle of the track jump signal TJ or the off track signal OT.

Subsequently, when the count value of the track jump signal TJ or the off track signal Ot, which are counted by the track counter 11 reaches a predetermined value (i.e., when movement over the desired number of tracks is completed) and the track jump signal TJ fails, a negative drive signal TD is output and deceleration is performed at a constant rate. When the off track signal goes low (i.e., when the pickup 3 is arranged above the track), the time from when the track jump signal TJ goes low to when the off track OT goes low is measured. If the deceleration relative to the measured time is sufficient, the drive signal TD is corrected so that the absolute value of the drive signal TD decreases. If the deceleration is insufficient, the drive signal TD is compensated so that the absolute value of the drive signal TD increases. In this manner, the pickup 3 is moved to the desired track.

As described above, when the pickup 3 performs the track jump, the speed of the pickup 3 is controlled by dividing the period during which the pickup 3 moves over one track into four parts. Accordingly, the speed of the pickup 3 is finely controlled. This prevents the pickup 3 from overrunning the predetermined track, or sliding. Accordingly, movement between songs on a CD and access of data on a CD-ROM takes place more quickly and accurately.

Figure 7:
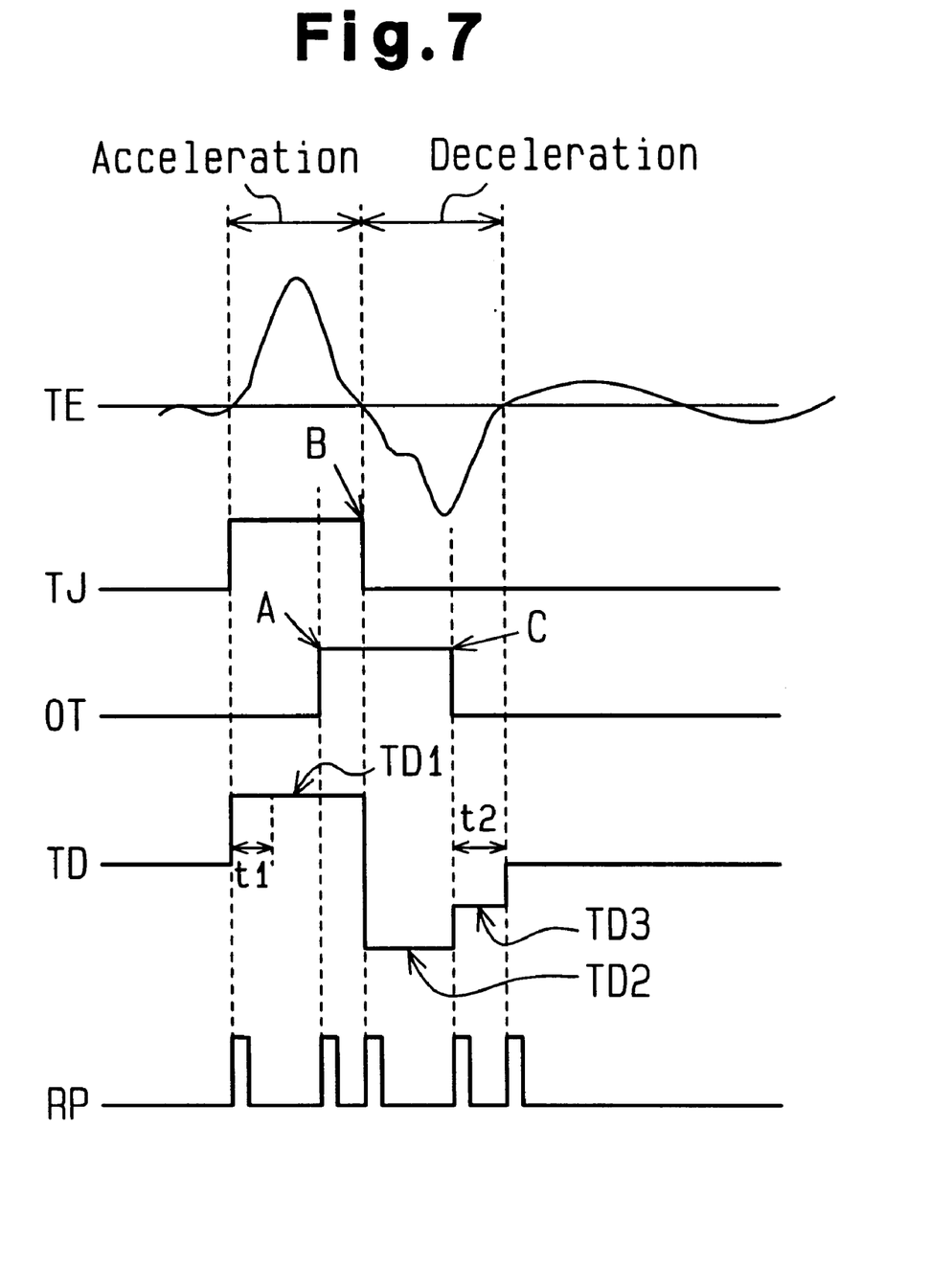
FIG. 7 is a timing chart illustrating a single track jump control operation performed by the track jump control circuit of FIG. 4.

A single track jump control operation performed by the track jump control circuit 100 will now be described with reference to the timing chart of FIG. 7. FIG. 7 shows the tracking error signal TE, the track jump signal TJ, the off track signal OT, the drive signal TD, and the latch pulse signal RP.

When acceleration is started (the left side of the drawing), the pickup 3 is located above a track and the off track signal OT is low. Further, the tracking error signal TE is substantially null. Thus, the track jump signal TJ is low. The control circuit 100 outputs a drive signal TD1 having a predetermined level in response to a track jump initiation signal TRG from an external apparatus and accelerates the pickup 3. Immediately after the acceleration is started, the tracking error signal TE is near a null level and the output of the drive signal TD1 is continued for a constant time t1 just in case the track jump signal TJ is unstable. After the pickup 3 has moved a certain distance, the pickup 3 is separated from the center of the track. Since this causes the auxiliary reading beam T1 or T2 to move over the track, the tracking error signal TE takes either a positive or negative value and the track jump signal TJ becomes either high or low. When the main reading beam P of the pickup 3 moves away from the track, the off track signal OT goes high at a first changing point A. When the pickup 3 reaches an intermediate position between adjacent tracks, the track jump signal TJ goes low at a second changing point B. The acceleration process is continued and the drive signal TD1 is maintained at a high level until point B.

During the single track jump, the count signal from the track counter 11 is already being output. The control circuit 10 proceeds to the deceleration process in response to the latch pulse signal RP that is output at the second change point B where the track jump signal TJ falls. Further, in response to the latch pulse signal RP output at the second changing point B, the counter 9 starts the counting operation. The control circuit 10 inverts the polarity of the drive signal TD (in this case, to the negative polarity) and outputs a deceleration drive signal TD2. When the main reading beam P moves onto the next track, the off track signal OT goes low at a third changing point C. The latch pulse signal RP is output at the third changing point C, and the counter 9 sends the count value in response to that latch pulse signal RP to reset the counter value. The control circuit 10 determines that the deceleration of the pickup 3 is sufficient if the count value exceeds a predetermined value and determines that the deceleration is insufficient if the count value is less than the predetermined value. If the deceleration is insufficient, the control circuit 10 outputs a drive signal TD3 corresponding to the difference between the predetermined value and the count value and decelerates the pickup 3 accordingly. When a predetermined time t2 elapses from the third changing point C, the deceleration process is finished. This causes the drive signal TD to go null and servo controls the pickup 3 along the track. In this manner, the pickup 3 is moved from one track to an adjacent track.

Accordingly, the deceleration status is monitored at the third changing point C. The monitored status is fed back to the deceleration process in order to prevent the pickup 3 from stopping before reaching the target position due to sliding or an excessive deceleration force.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A method for controlling track jump on a disc by a pickup, the method comprising the steps of:

generating a track jump signal having a first changing point when the pickup is located above a track and a second changing point when the pickup is located between adjacent tracks;

generating an off track signal indicating a first state when the pickup is located above a track and a second state when the pickup is located apart from the track, wherein the off track signal is changed from the first state to the second state at a third changing point and changed from the second state to the first state at a fourth changing point;

dividing a cycle of the track jump signal and the off track signal into four periods at the first to fourth changing points of the track jump signal and the off track signal;

measuring the length of the divided four periods; and controlling the moving speed of the pickup in accordance with the lengths of the divided four periods.

2. The method according to claim 1, wherein the off track signal generating step includes generating the off track signal using an output signal of a main light receiving portion of the pickup, and wherein the track jump signal generating step includes generating the track jump signal using an output signal of a auxiliary light receiving portion of the pickup.

3. A method for controlling track jump on a disc by a pickup, the method comprising the steps of:

generating a track jump signal having a first changing point when the pickup is located above a track and a second changing point when the pickup is located between adjacent tracks;

generating an off track signal indicating a first state when the pickup is located above a track and a second state when the pickup is located apart from the track, wherein the off track signal is changed from the first state to the second state at a third changing point and changed from the second state to the first state at a fourth changing point;

detecting one of the first changing point and the second changing point of the track jump signal corresponding to one of a target track to where the pickup jumps and a track located a predetermined number of tracks before the target track;

decelerating the pickup when one of the first changing point and the second changing point is detected;

measuring the time between one of the first changing point and the second changing point and one of the third changing point and the fourth changing point of the subsequently generated off track signal; and adjusting the deceleration of the pickup in accordance with the measured time.

4. A circuit for controlling track jump on a disc by a pickup, the circuit comprising:

a measuring circuit for receiving a track jump signal, which has a first changing point and a second changing point, and an off track signal, which has a third changing point and a fourth changing point, and measuring a length between one of the first changing point and the second changing point of the track jump signal and one of the third changing point and the fourth changing point of the off track signal, wherein the first changing point occurs when the pickup is located above a track, the second changing point occurs when the pickup is located between adjacent tracks, the third changing point occurs when the off track signal changes from a first state to a second state, and the fourth changing point occurs when the off track signal changes from the second state to the first state; and a control circuit connected to the measuring circuit to generate a drive signal corresponding to the measured result of the remaining circuit.

5. The circuit according to claim 4, wherein the measuring circuit includes:

a first latch pulse generating circuit for generating a first latch pulse signal at the first and second changing points of the track jump signal;

a second latch pulse signal for generating a second latch pulse signal at the third and fourth changing points of the off track signal; and a counter connected to the first and second latch pulse generating circuits to generate a count signal by counting clocks having a predetermined cycle in response to the first and second latch pulse signals.

6. A circuit for controlling track jump on a disc by a pickup, the circuit comprising:

a measuring circuit for receiving a track jump signal, which has a first changing point and a second changing point, and an off track signal, which has a third changing point and a fourth changing point, and measuring the length between one of the first changing point and the second changing point of the tack jump signal and one of the third changing point and the fourth changing point of the off track signal, wherein the first changing point occurs when the pickup is located above a track, the second changing point occurs when the pickup is located between adjacent tracks, the third changing point occurs when the off track signal changes from a first state to a second state, and the fourth changing point occurs when the off track signal changes from the second state to the first state;

a track counter for detecting one of the first changing point and the second changing point of the track jump signal corresponding to one of a target track to where the pickup jumps and a track located a predetermined number of tracks before the target track; and a control circuit connected to the measuring circuit and the track counter for generating a drive signal when one of the first changing point and the second changing point is detected by the track counter, wherein the control circuit controls deceleration of the pickup by adjusting the drive signal in accordance with the time measured by the measuring circuit.

* * * * *